US012570324B2

(12) United States Patent
Hallaczek et al.

(10) Patent No.: US 12,570,324 B2
(45) Date of Patent: Mar. 10, 2026

(54) COMPUTER SYSTEM FOR PROVIDING A PLURALITY OF FUNCTIONS FOR A DEVICE, IN PARTICULAR FOR A VEHICLE, BY SEPARATION OF A PLURALITY OF ZONES

(71) Applicant: Robert Bosch GmbH, Stuttgart (DE)

(72) Inventors: Felix Hallaczek, Stuttgart (DE); Alexander Kaucher, Ulm (DE); Manuel Jauss, Wissgoldingen (DE); Marcel Kneib, Ingelheim (DE); Nils Benecke, Ludwigsburg (DE); Razvan Florin Aguridan, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 368 days.

(21) Appl. No.: 18/297,851

(22) Filed: Apr. 10, 2023

(65) Prior Publication Data

US 2023/0365162 A1     Nov. 16, 2023

(30) Foreign Application Priority Data

May 13, 2022     (DE) ..................... 10 2022 204 716.8

(51) Int. Cl.
*B60W 60/00* (2020.01)
*H04W 12/04* (2021.01)
*H04W 12/08* (2021.01)

(52) U.S. Cl.
CPC ...... *B60W 60/00188* (2020.02); *H04W 12/04* (2013.01); *H04W 12/08* (2013.01)

(58) Field of Classification Search
CPC ............................. H04W 12/04; H04W 12/08; B60W 60/00188
See application file for complete search history.

(56) References Cited

U.S. PATENT DOCUMENTS

| | | | |
|---|---|---|---|
| 9,178,880 B1 * | 11/2015 | Dotan | H04W 12/068 |
| 9,363,090 B1 * | 6/2016 | Paczkowski | H04L 63/0428 |
| 10,127,161 B2 * | 11/2018 | Wegner | G06F 11/0724 |
| 11,334,451 B2 * | 5/2022 | Eckelmann-Wendt | G06F 11/28 |
| 11,941,259 B2 * | 3/2024 | Geng | G06F 3/0679 |
| 12,280,807 B2 * | 4/2025 | Mueck | H04W 12/06 |
| 12,287,867 B2 * | 4/2025 | Jauss | G06F 12/1441 |

(Continued)

*Primary Examiner* — Carl C Staubach
(74) *Attorney, Agent, or Firm* — NORTON ROSE FULBRIGHT US LLP

(57) ABSTRACT

A computer system for providing a plurality of functions for a device, in particular for a vehicle, by separation of a plurality of zones. The computer system has a plurality of system modules configured to provide functions that are differently critical for the operational security of the device. A zone is a logically and/or physically delimitable unit in the computer system. A first zone is more trustworthy than a second, less trustworthy zone. The danger of a manipulation of a more trustworthy zone is less than of a less trustworthy zone. The first zone is assigned a first number of protective mechanisms and the second zone is assigned a second number of protective mechanisms. The first number of protective mechanisms protecting the first zone from manipulation to a greater extent than that to which the second number of protective mechanisms protects the second zone.

25 Claims, 3 Drawing Sheets

(56)         References Cited

U.S. PATENT DOCUMENTS

| | | | | |
|---|---|---|---|---|
| 2008/0082646 | A1* | 4/2008 | Shenfield | H04L 67/04 |
| | | | | 709/223 |
| 2011/0010543 | A1* | 1/2011 | Schmidt | H04W 12/06 |
| | | | | 713/168 |
| 2015/0212952 | A1* | 7/2015 | Wegner | G06F 8/656 |
| | | | | 711/152 |
| 2023/0367910 | A1* | 11/2023 | Hallaczek | G06F 21/629 |
| 2024/0134709 | A1* | 4/2024 | Mansbart | G06F 9/544 |

* cited by examiner

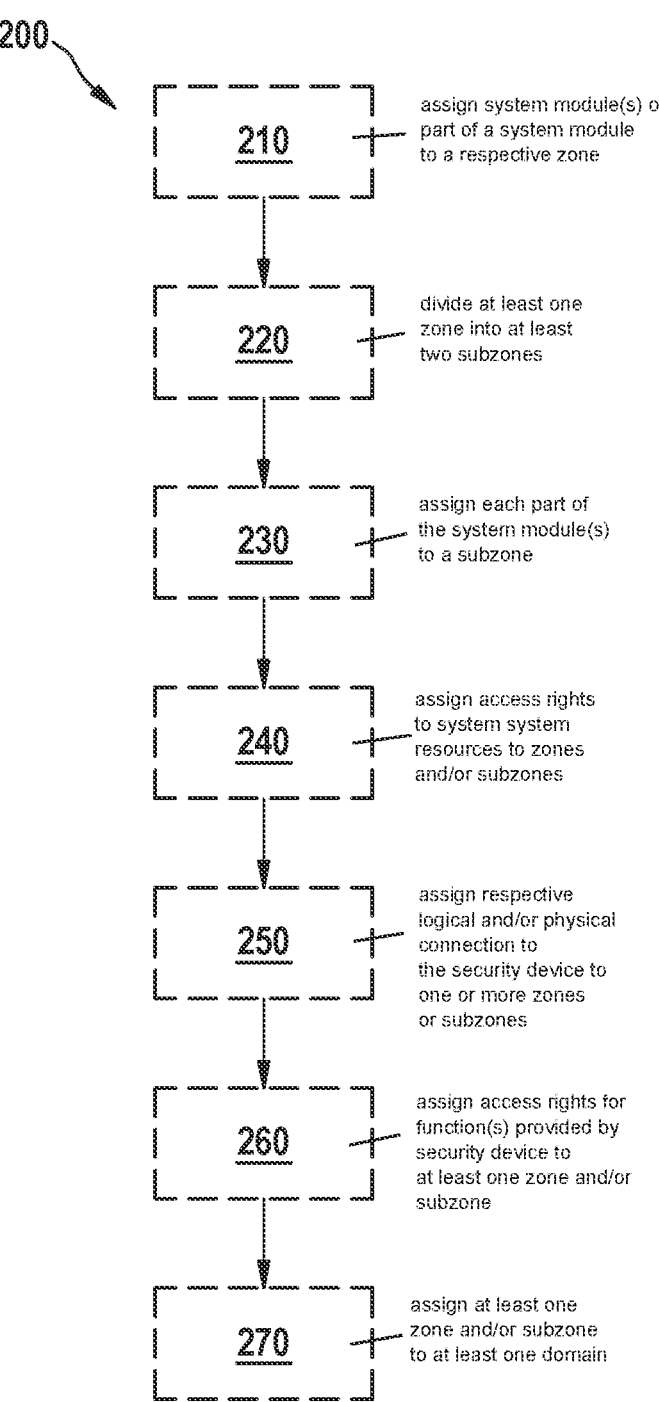

200

210 — assign system module(s) or part of a system module to a respective zone

220 — divide at least one zone into at least two subzones

230 — assign each part of the system module(s) to a subzone

240 — assign access rights to system system resources to zones and/or subzones

250 — assign respective logical and/or physical connection to the security device to one or more zones or subzones 260 — assign access rights for function(s) provided by security device to at least one zone and/or subzone 270 — assign at least one zone and/or subzone to at least one domain

Fig. 2

COMPUTER SYSTEM FOR PROVIDING A PLURALITY OF FUNCTIONS FOR A DEVICE, IN PARTICULAR FOR A VEHICLE, BY SEPARATION OF A PLURALITY OF ZONES

CROSS REFERENCE

The present application claims the benefit under 35 U.S.C. § 119 of German Patent Application No. DE 10 2022 204 716.8 filed on May 13, 2022, which is expressly incorporated herein by reference in its entirety.

BACKGROUND INFORMATION

The demand for "smarter mobility" implies the integration of the vehicle into the digital world. Expanded security features and the enabling of fully autonomous systems require significantly more computing power than in previous systems. Further, consumer electronics are merging with the classic vehicle. Networking the vehicles with each other and/or with a backend situated in a cloud increases the number of necessary interfaces and thus the attack surface for external attacks on the IT system of the vehicles. As a result, cybersecurity is playing an increasingly important role in the software and hardware development of today's vehicles. As vehicles become increasingly networked, the potential for damage increases, because entire fleets of vehicles can be exposed to cyberattacks simultaneously and independent of their location.

Previous E/E architectures are based on the idea of being easily integratable and producible in modular fashion. They are constructed in a flat hierarchy and are made up of function-specific electronic control units (ECUs) that are interconnected directly or via gateways. In this context, the gateway can ensure the communication between the various interfaces and can monitor the data traffic. In recent years, the number of control devices required has increased, resulting in a large number of overlapping functions. Novel functions increase the complexity and the need for interaction between several control devices. The latter in particular leads to problems with regard to the development of control devices by different manufacturers. The trend is therefore towards a centralized E/E architecture, in which application areas (e.g., multimedia/cockpit, power train, etc.) are merged with one another. The goal here is a vehicle-unified E/E architecture with a central vehicle computer, the central vehicle computer being logically and physically divided into zones internally, which is known as a zone-based E/E architecture.

By unifying different areas, each with its own security requirements, in one or a few computing units, functions are no longer separated from each other in terms of hardware (for example as was previously the case given physical separation of a control device for controlling braking functions). For example, as soon as an area having a high level of connectivity to the outside is compromised by external intervention (manipulation), there is a risk of manipulation of other functions as well, which can for example have an effect on operational security and can cause hazardous situations. Therefore, there is a need to increase operational security in architectures with central vehicle computers.

SUMMARY

A first general aspect of the present invention relates to a computer system for providing a plurality of functions for a device, in particular for a vehicle, by separation of a plurality of zones. According to an example embodiment of the present invention, the computer system has a plurality of system modules and the plurality of system modules being configured to provide functions that are differently critical for the operational security of the device, a zone being a logically and/or physically delimitable unit in the computer system, and a first zone of the plurality of zones being more trustworthy than a second, less trustworthy zone of the plurality of zones, the danger of a manipulation of a more trustworthy zone being less than of a less trustworthy zone, and the first zone being assigned a first number of protective mechanisms and the second zone being assigned a second number of protective mechanisms, the first number of protective mechanisms protecting the first zone from manipulation to a greater extent than the second number of protective mechanisms protects the second zone.

Further disclosed is a computer system according to an example embodiment of the present invention designed to carry out a computer-implemented method for enforcing zone separation in a computer system by separation of a plurality of zones.

Further disclosed is a computer program according to an example embodiment of the present invention designed to carry out the computer-implemented method for enforcing a zone separation in a computer system.

Further disclosed is a computer-readable medium or signal that stores and/or contains the computer program, according to an example embodiment of the present invention.

The computer system provided in the present disclosure according to the first general aspect (or an embodiment thereof) enables consolidation of different domains with security and safety classification in one computer system, e.g., a vehicle computer. This can reduce a potential attack surface due to centralization. By logically and/or physically dividing the computer system (e.g. vehicle computer) into zones and separating them, a greater differentiation of the security requirements for the respective zones can be realized. For example, zones that have high relevance for operational security can be separated from functions that are less relevant for operational security but more susceptible to external interventions or manipulation, for example in the context of a cyberattack. Separating the zones can further reduce the probability of a successful manipulation in one zone spreading to other zones. The assignment of access rights to system resources and their implementation according to the principle of least privilege can be simplified by centralizing the functions on the computer system (e.g. vehicle computer) and by the zone separation, as can their protection against harmful manipulation. Enabling a centralized zone-based E/E architecture while maintaining the required security requirements enables a reduction in complexity due to a reduced number of computing units in the vehicle, which can lead to savings in costs, weight, and energy.

Some terms are used in the present disclosure as follows:

A "zone" can be a logically (functionally) and/or physically (locally) delimitable unit in a computer system. A zone can include one or more system modules and/or a part and/or parts of a system module. A zone can be defined, that is determined, by its components. All system modules or parts of system modules assigned to a zone can form the zone. A zone can include various computing units, computing cores, controllers, control units, storage units, peripheral devices, communication interfaces, network components, software applications, software architectures, etc., and/or all other software and/or hardware components, or parts of the above-named. A plurality of zones can form an overall system.

A "subzone" can be a logically (functionally) and/or physically (locally) delimitable subunit of a zone. A zone can be divided into at least two subzones. A subzone can include parts of the system modules that are assigned to the corresponding zone. A subzone can here include various computing units, computing cores, control units, storage units, peripheral devices, communication interfaces, network components, software applications and/or software architectures, etc., and/or all other software and/or hardware components, or parts of the above-named that are contained in the subdivided zone. All subzones of a zone can form the zone.

A "system module" can include a hardware and/or software unit that provides a plurality of functions. A system module can include one or more processors, controllers, control units, (communication) interfaces, network components, software applications, software architectures, etc., and/or all other software and/or hardware components, or parts of the above-named. A system module can be situated in a zone or in a subzone.

A "system resource" can be a software and/or hardware component that provides services for system modules. For example, a system resource can include one or more memories and/or one or more peripheral devices. Via an access right, a system module can be permitted to access a system resource.

A "memory" can be a data storage device or also a data carrier on/in which data is stored (saved). A memory can be read or written by a computer or some kind of peripheral device. A memory can be a semiconductor memory and/or a magnetic memory or a memory based on a technology not named here. A memory can be a volatile memory and/or non-volatile memory. A memory can include for example one of DRAM, RAM, ROM, EPROM, HDD, SDD, . . . on/in which the data are stored.

A "peripheral device" can be a component that can be connected to a (central) computing unit. Such a component may require controlling by the computing unit and, in some cases, an initialization. A peripheral device can include a part of a computer that offers functionalities that cannot be provided by a computing core itself but by additional hardware. For example, a peripheral device may include an analog-to-digital converter (ADC), a timer, or an interface such as a serial peripheral interface (SPI).

A "domain controller" can include an extended resource domain controller (XRDC). A domain controller can include peripheral devices implemented in hardware and can manage access rights for, for example, memory units and/or external peripheral devices. A domain controller can segregate different peripheral devices and/or protect the memory of a system, where a domain of a domain controller can be a contiguous area that has equal access rights to peripheral devices and/or memory units.

A "computing core" means the central part of a microprocessor; there may also be a plurality of computing cores in a microprocessor. A computing core can carry out arithmetic and/or logical operations on input data and/or information.

A "memory protection unit" can be a hardware and/or software unit. A memory protection unit can have registers, the registers containing or describing memory areas. A memory protection unit may have its own memory, a preconfigured hardware logic unit, and an internal data connection. A memory protection unit can have an interface to the outside, for example to a computing core or communication connection. A memory protection unit can be part of a processor (central processing unit, CPU).

A "vehicle" can be any device that transports passengers and/or freight. A vehicle can be a motor vehicle (for example, a car or a truck), but also a rail vehicle. A vehicle can also be a motorized, non-motorized, and/or muscular force-powered two- or three-wheeled vehicle. However, floating and flying devices can also be vehicles. Vehicles can operate at least semi-autonomously or in assisted fashion.

A "function" can be any subtask performed during the operation of a device. A function can relate to the control, regulation, or monitoring of the device or of a part of the device (e.g. a component of the device). Additionally or alternatively, a function can relate to the data processing or signal processing in the device (e.g., a communication function).

BRIEF DESCRIPTION OF THE DRAWINGS

FIG. 2 schematically illustrates exemplary method steps for enforcing a zone separation in a computer system, according to the present invention.

DETAILED DESCRIPTION OF EXAMPLE EMBODIMENTS

Figure 1A:
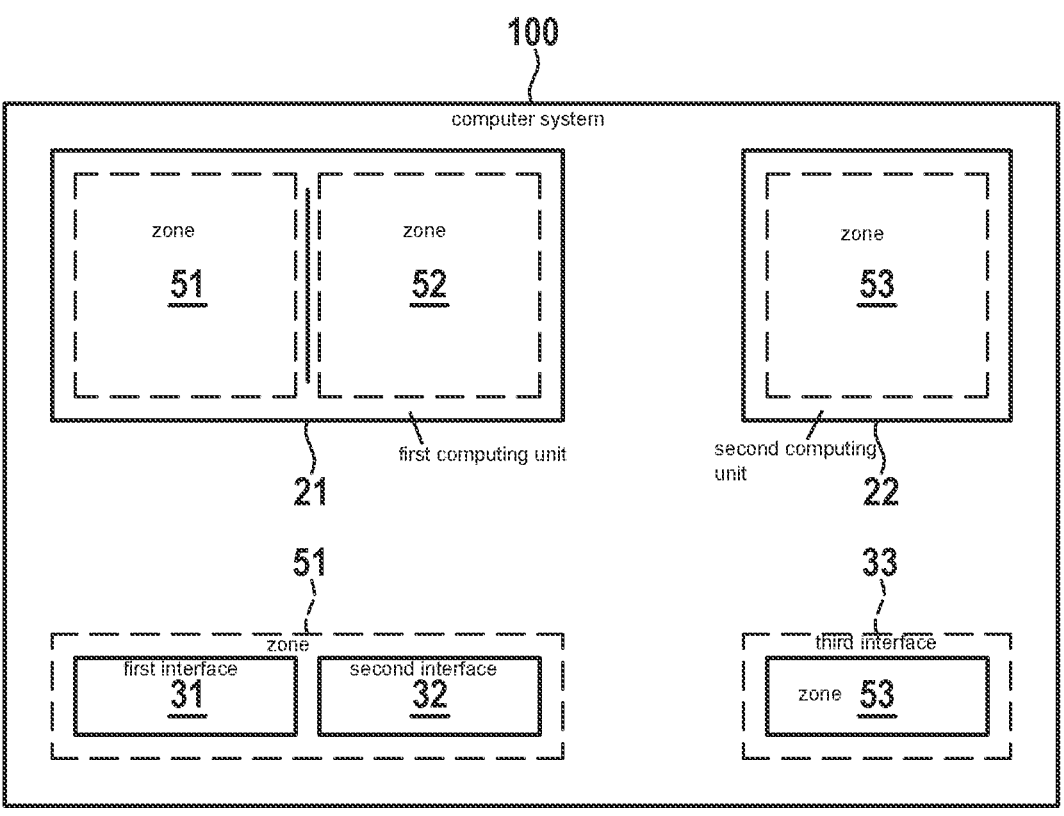
FIGS. 1A and 1B illustrate an exemplary specific embodiment of a computer system for providing a plurality of functions for a device by separation of a plurality of zones, according to the present invention.

Disclosed is a computer system 100 for providing a plurality of functions for a device, in particular for a vehicle, by separation of a plurality of zones 51, 52, 53, the computer system having a plurality of system modules and the plurality of system modules being configured to provide functions that are differently critical for the operational security of the device. A zone 51, 52, 53 is a logically and/or physically delimitable unit in the computer system 100, and a first zone 51, 52 of the plurality of zones is more trustworthy than a second, less trustworthy zone 53 of the plurality of zones, the danger of a manipulation of a more trustworthy zone 51 being less than of a less trustworthy 53 zone. A manipulation can be an external attack that reduces operational security. Computer system 100 can have a plurality of system resources. FIG. 1A shows an exemplary specific embodiment of the computer system 100, having a first computing unit 21 and a second computing unit 22, with three zones 51, 52, 53. For example, $\geq 1$, $\geq 2$, $\geq 3$, $\geq 4$, $\geq 5$, $\geq 6$, $\geq 10$, $\geq 20$ or more zones 51 can be separated in computer system 100. For example, computer system 100 can include a (central) vehicle computer (e.g., a vehicle computer can form computer system 100). In other examples, computer system 100 can include an embedded system (e.g. an embedded system can form computer system 100). An embedded system is an electronic computer that is integrated into a technical context. An embedded system can perform regulation, control, monitoring functions or data processing tasks. In other examples (or in addition), computer system 100 can include one or more control devices (ECUs) (e.g. one or more ECUs can form computer system 100).

The extent to which a zone is more or less trustworthy, i.e. the degree of trustworthiness, can be based on a classification of zones 51, 52, 53 on the basis of a security level. The computer system of the present disclosure can have at least two security levels, but can also have more than two security levels (e.g. more than five). The degree of trustworthiness or the security level can be determined by the configuration of the corresponding zone (e.g., the system modules contained therein). For example, the degree of security, or the extent of security measures with which the system modules of a zone 51, 52, 53 are protected for example against manipulation, for example in the context of an external attack, can determine whether a zone 51, 52, 53 is more trustworthy or less trustworthy, or what security level it has (e.g., the presence of certain hardware- and/or software-based security measures in the system modules of the zone). In addition, for example the extent of communication of the system modules situated in the corresponding zone with external systems, such as a backend, can determine what degree of trustworthiness a zone has, or what security level it has. For example, a zone that communicates predominantly or exclusively within the computer system may be more trusted than a zone that communicates at least partly with external systems (e.g., a backend, other devices such as vehicles, or infrastructure components). In some examples, with regard to their trustworthiness the zones are divided into non-trustworthy zones and trustworthy zones. A more trustworthy zone 51, 52 as described herein may for example be trustworthy, and a less trustworthy zone 53 as described herein may be nontrustworthy. A computer system 100, for example a computer system of a vehicle, may for example be the target of a cyberattack, whereby security-critical functions, such as a braking function in a vehicle, may be disabled or manipulated such that a hazardous situation may arise.

A more trustworthy zone here is a zone 51 whose manipulation is less probable than the manipulation of a less trustworthy zone. For example, a zone 53 that includes multimedia functions and has many interfaces for communication with a backend may be a less trustworthy zone 53, because the probability of an external attack on a communication channel to the backend is higher than for a zone 51 that includes predominantly functions that only require information from within the vehicle and/or only carry out processes within the vehicle. In addition, the first zone 51, 52, which is more trustworthy, is assigned a first number of protective mechanisms and the second zone 53, which is less trustworthy, is assigned a second number of protective mechanisms. The first number of protective mechanisms protects the first zone 51, 52 from manipulation to a greater extent than the second number of protective mechanisms protects the second zone 53.

The first number of protective mechanisms may include $\geq 1$, $\geq 2$, $\geq 3$, $\geq \ldots$, $\geq 10$ or more protective mechanisms. The second number of protective mechanisms may include $\geq 1$, $\geq 2$, $\geq 3$, $\geq \ldots$, $\geq 10$ or more protective mechanisms. In an example, the first number of protective mechanisms may protect the first zone 51, 52 to a greater extent than that to which the second number of protective mechanisms protects the second zone 53, in that the first number of protective mechanisms reduce the danger or probability of a manipulation of the first zone 51, 52 to a greater extent than the second number of protective mechanisms reduce the danger or probability of manipulation of the second zone 53. In an example, the first number of protective mechanisms may include protective mechanisms that are more complex or difficult to breach, or, in other words, provide a higher level of security than protective mechanisms that may be included by the second number of protective mechanisms. In an example, the computational power and/or amount of time required to breach a protective mechanism of the first number of protective mechanisms may be higher than the computational power and/or time required to breach a protective mechanism of the second number of protective mechanisms. In another example, the first number of protective mechanisms may include protective mechanisms that require more processing power and/or a longer runtime to execute than protective mechanisms of the second number of protective mechanisms. For example, the first and second numbers of protective mechanisms may include protective mechanisms that protect against certain types of (cyber) attacks. For example, protective mechanisms may include a firewall. In an example, the first number of protective mechanisms may protect the first zone to a greater extent than the second number of protective mechanisms protects the second zone 53, in that the first number of protective mechanisms can increase the probability of detecting a manipulation of the first zone to a greater extent than the second number of protective mechanisms increases the probability of detecting a manipulation of the second zone. In an example, the probability of detecting a manipulation realized by a protective mechanism of the first number or the second number of protective mechanisms can be determined by the proportional number of detected manipulations of a total number of manipulations. For example, the first or second number of protective mechanisms that increase the probability of detecting a manipulation may include mechanisms for monitoring, such as IDPS (intrusion detection and prevention system).

In an example, the first number of protective mechanisms and/or the second number of protective mechanisms may include a runtime manipulation detection (RTMD). In an example, a first number of protective mechanisms can include a first update mechanism for computer system 100 or parts thereof and/or a second number of protective mechanisms can include a second update mechanism for computer system 100 or parts thereof. For example, the first update mechanism may require more processing power and/or more time to execute, but may provide a higher level of security than the second update mechanism.

The first set of protective mechanisms may include a first startup process and/or a first mechanism for securing communication, and/or the second set of protective mechanisms may include a second startup process and/or a second mechanism for securing communication. A startup process is used to start up (boot) computer system 100. For example, there may be a plurality of startup processes that may differ in their performance (duration until the (approximately) complete starting up of the system) and/or in their security, where security may be aimed at the extent to which a startup process can reduce the probability of a manipulation of computer system 100 by an external attack and/or the extent to which a startup process can increase the probability of detecting a manipulation of computer system 100 by an external attack. In some examples, the time until complete startup of computer system 100 using the first startup process may be longer than a time until complete startup of computer system 100 using the second startup process.

For example, a second startup process can include an algorithm that reduces the probability of a manipulation to a lesser extent and/or increases the probability of detecting a manipulation to a lesser extent, but can be executed more quickly than an algorithm in a first startup process that reduces the probability of a manipulation to a greater extent and/or increases the probability of detecting a manipulation to a greater extent, but can only be executed more slowly. For example, the plurality of startup processes may include different cryptographic algorithms.

For example, the first mechanism for securing communications may include a first (cryptographic) encryption method. For example, the first encryption method may involve the use of RSA4k signatures (Rivest-Shamir-Adleman, RSA). For example, the second mechanism for securing communication may include a second (cryptographic) encryption method. For example, the second encryption method may include the use of RSA3k signatures.

Also disclosed is a computer-implemented method 200 for enforcing a zone separation in a computer system 100. The method may include carrying out a verification of subsequent steps of a startup process by a security device in order to determine a manipulation of subsequent steps of a startup process. For example, a security device may include a hardware security engine (HSE). For example, the security device can check subsequent steps of a startup process for manipulation in order to determine that the subsequent steps are not corrupted. For example, the scope of the verification can be varied. For example, a verification can be performed based on a required performance. For example, an intensive (i.e. accurate) verification may take longer (i.e. lower performance) than a less intensive (i.e. less accurate) verification. For example, a first zone 51, 52 that is more trustworthy may have a first startup process assigned to it whose steps are more accurately verified than those of a second startup process assigned to a zone 53 that is less trustworthy.

Figure 1B:
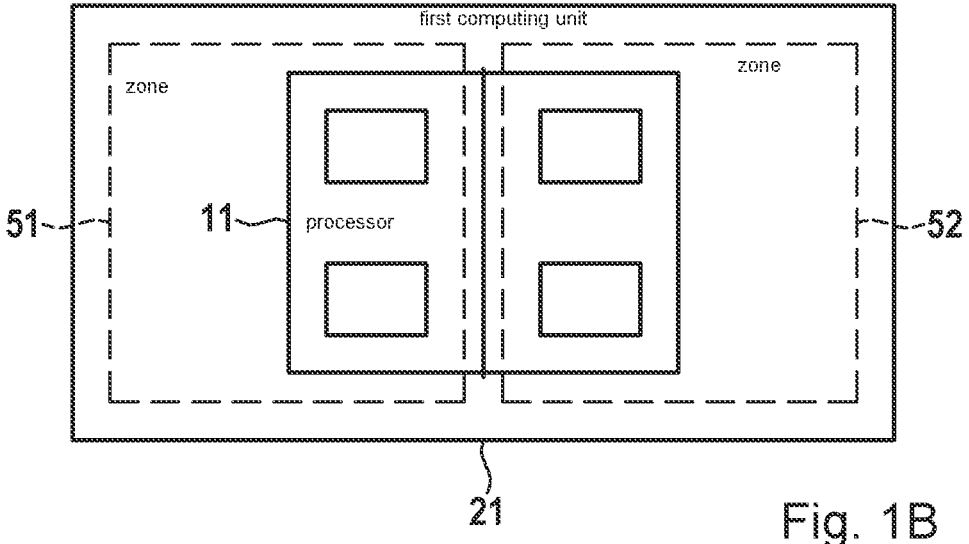

In some examples, method 200 can include assigning 210 of one system module, a plurality of system modules, or a part of a system module from a plurality of system modules to a respective zone of the plurality of zones. In some examples, a system module can include a processor, an interface, and/or a network component or parts thereof. FIG. 2 shows in exemplary fashion the steps of method 200. For example, $\geq 1$, $\geq 2$, $\geq 3$, $\geq 4$, $\geq 5$, $\geq 6$, $\geq 10$, $\geq 20$ or more system modules (e.g. processors) or parts thereof (e.g. computing cores) may be assigned 210 to a zone. As is shown in FIG. 1B, the first zone 51 may be assigned 210 a part (e.g. two computing cores) of the plurality of computing cores of a processor 11 (e.g. four computing cores) and the second zone 52 may be assigned 210 another part (e.g. two remaining computing cores) of the plurality of computing cores of the processor 11. In some examples, a system module can include interfaces, bus system, or parts thereof. FIG. 1A shows as an example first zone 51, to which a first interface 31 and a second interface 32 are assigned, and third zone 53, to which a third interface 33 is assigned. For example, an interface may include a CAN bus interface, a CAN FD bus interface, and/or a GMAC port. For example, a system module assigned to a first zone 51 may include a first software architecture and another system module assigned to a second zone 52 may include a second software architecture. For example, a part of a system module assigned to a first zone 51 can include a first software architecture and another part of the system module assigned to a second zone 52 can include a second software architecture. In some examples, computer system 100 can include a domain controller 70, for example an extended resource domain controller (XRDC). For example, the assigning 210 of one system module, a plurality of system modules, or a part of a system module from a plurality of system modules to a respective zone of the plurality of zones can be carried out by domain controller 70.

Figure 3:
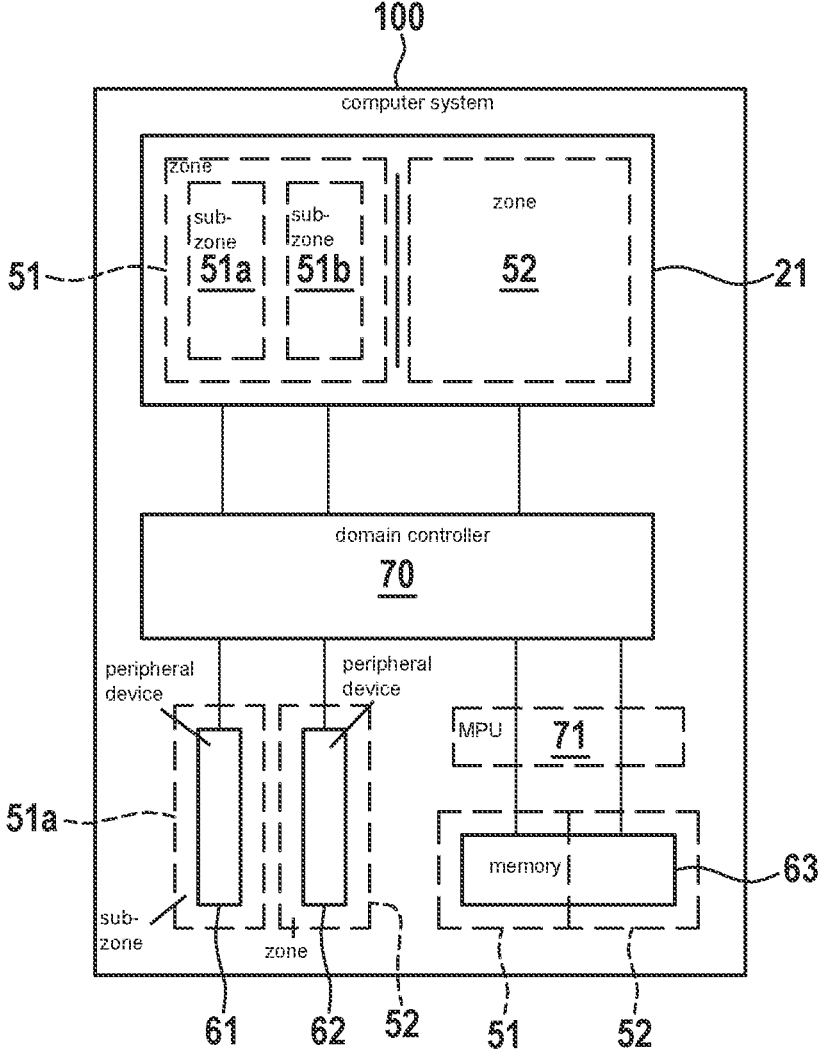
FIG. 3 illustrates an exemplary specific embodiment of a computer system for providing a plurality of functions for a device, according to an example embodiment of the present invention, the computer system having a domain controller.

In some examples, method 200 can include a dividing 220 of at least one zone 51, 52, 53 of the plurality of zones into at least two subzones. Further, the separating 200 can include an assigning 230 in each case of a part of the one or more system modules of the corresponding zone to the subzone. Further, method 200 can include an assigning 240 of access rights to system resources to the zones and/or subzones, where system resources include peripheral devices and/or memories of the system. For example, a zone 51 can be divided 220 into $\geq 2$, $\geq 3$, $\geq 4$, $\geq 5$, $\geq 6$, $\geq 10$, $\geq 20$ or more subzones 51a, 51b. In FIG. 3, zone 51 is divided into two subzones 51a and 51b as an example. For example, a processor having a plurality of computing cores (e.g. four computing cores) can be assigned 230 to a zone 51. A first part of the computing cores (e.g. two computing cores) can for example be assigned 230 to the first subzone 51a, and the remaining computing cores (e.g. two computing cores) can for example be assigned 230 to the second subzone 51b. For example, a first software application can be executed on a computing core assigned to the first subzone 51a and a second software application can be executed on at least one computing core assigned to the second subzone 51b. For example, equal access rights to a memory and/or peripheral devices of the system can be assigned 240 to a subzone 51a; that is, the system modules (e.g. processors) or parts thereof (e.g. computational cores) assigned to a common subzone 51a may be assigned 240 the same access rights to system resources that include for example memories 63 and/or peripheral devices 61, 62. For example, the system modules or parts thereof assigned to a common zone 51 can be assigned the same access rights to system resources. In some examples, the assignment of access rights to system resources may be based on the principle of least privilege (PoLP). This means that the zones and/or subzones are each assigned access rights only for the system resources they need to perform their tasks. This means that the system modules assigned to the zones and/or subzones are each assigned only the access rights to system resources that they need to provide the respective functions of the device. For example, the dividing 220 of a zone into at least two subzones, the assigning 230 in each case of a part of the one or more system modules of the corresponding zone to the subzone, and/or the assigning 240 of access rights to system resources can be carried out by domain controller 70. In some examples, domain controller 70 can monitor the access of the zones and/or subzones based on access rights for the peripheral devices 61, 62 and/or memories 63.

In some examples, method 200 can include an assigning 250 of a respective logical and/or physical connection to the security device to one or more zones 51, 52, 53 and/or subzones 51a, 51b. For example, the security device may provide cryptographic keys for the corresponding zone 51, 52, 53 or subzone 51a, 51b, and each zone 51, 52, 53 or subzone 51a, 51b may be permitted to access only keys intended for that zone 51, 52, 53 or subzone 51a, 51b. For example, a logical and/or physical connection can include a messaging unit (MU) assigned 250 to a zone 51, 52, 53 or subzone 51a, 51b in order to exchange messages and/or data with the security device. For example, domain controller 70 can carry out the assigning 250 of the logical and/or physical connection to one or more zones 51, 52, 53 and/or subzones 51a, 51b. For example, the security device can provide cryptographic keys that can be used by the zones and/or subzones for example for decryption and/or encryption of data in the context of a communication with external units (that is, outside the system; e.g. a cloud) and/or system-internal units. For example, to ensure or enable a separation of zones 51, 52, 53 and/or subzones 51a, 51b, a zone 51, 52, 53 or subzone 51a, 51b may for example be permitted to access only keys that are intended for the corresponding zone 51, 52, 53 or subzone 51a, 51b, in order for example to prevent manipulation of a zone 51, 52, 53 or subzone 51a, 51b by another zone or subzone. In some examples, the security device may provide a signature verification for example for zones 51, 52, 53 and/or subzones 51a, 51b. For example, a signature verification can be used to ensure or enable that a zone 51, 52, 53 or subzone 51a, 51b can access only keys that are intended for the corresponding zone 51, 52, 53 or subzone 51a, 51b.

In some examples, the security device can serve as a trust anchor (root-of-trust). The trust anchor can include the fundamental source of the trustworthiness. For example, the chain of trust (CoT) can be started at the trust anchor when computer system 100 is started up. During startup, the trust anchor forms the first stage that checks subsequent steps of a startup process to determine that subsequent steps of the startup process are not corrupted. For example, for a trust anchor trust can be assumed and not derived. For example, trust may include the assumption that the trust anchor has not been corrupted or altered so as to be damaged by a manipulation. For example, starting from a trust anchor trust can be derived for subsequent stages of a computer system 100.

In some examples, method 200 can include an assigning 260 of access rights for a plurality of functions provided by the security device to at least one zone 51, 52, 53 and/or subzone 51a, 51b. For example, functions provided by the security device may include security functions such as encryption functions, for example for the transmission of data. Further, functions provided by the security device may include a function for changing a life cycle state. For example, an access right for a function for changing a life cycle state may be assigned only to the zone or subzone 260 that is responsible for this change. For example, the assigning 260 of the access rights to the zones and/or subzones can be carried out by domain controller 70 and/or the security device (HSE).

In some examples, accesses to keys and/or functions provided by the security device by more trustworthy zones and/or more trustworthy subzones can be prioritized over less trustworthy zones and/or less trustworthy subzones. For example, a more trustworthy zone 51 and/or a more trustworthy subzone 51a may be granted higher priority of access to a key and/or a function, such as a security function, over a less trustworthy zone 53 and/or less trustworthy subzone. For example, a prioritization can be carried out by the security device and/or by domain controller 70.

In some examples computer system 100 can include a domain controller 70, as mentioned above. For example, domain controller 70 can have a plurality of domains. In addition, method 200 can include an assigning 270 of at least one zone 51, 52, 53 and/or subzone 51a, 51b to at least one domain. In some examples, a domain can have equal access rights to system resources. A domain can include a logical/physical area that has equal access rights to memories and/or peripheral devices. A domain controller 70 can contain ≥1, ≥2, ≥3, ≥4, ≥5, ≥6, ≥7, ≥8 or more domains. In some examples, a domain may be assigned a trustworthiness/security level. For example, a first domain (e.g. domain 0) of a plurality of domains (for example eight domains) may be assigned a lower trustworthiness than an eighth domain (e.g. domain 7). In some examples, zones 51, 52, 53 and/or subzones 51a, 51b may be assigned to a domain with the same access rights to system resources (e.g. memories 63, peripheral devices 61, 62). For example, domain controller 70 can carry out method 200 or individual steps of method 200.

In some examples, method 200 can be carried out statically and authentically. For example, the assigning 210, 230, 240, 250, 260, 270 and the dividing 220 can be carried out statically and non-modifiably. For example, method 200 can be carried out as part of an initialization and/or a configuration in the startup process. For example, rights for initialization and/or configuration can be removed after the initialization and/or configuration is finished, in order to prevent the initialization and/or configuration from being changed again after its ending. For example, after removing the rights for initialization and/or configuration, it can be that no component has rights for initialization and/or configuration, in order to ensure or guarantee that method 200 is carried out statically and authentically in order to prevent subsequent manipulation.

In some examples, method 200 can be adapted in the event of suspicion or in case of manipulation, in order to avoid a hazardous situation. For example, the assigning 210, 230, 240, 250, 260, 270 and dividing 220 can be adapted in case of suspicion or in the event of a manipulation, in order to avoid a hazardous situation. For example, method 200 can be carried out in the startup process in the context of a first initialization and/or a first configuration. For example, the first initialization and/or a first configuration based on an incident may be replaced by a subsequent configuration of a plurality of configurations (e.g. ≥2, ≥3, ≥4, ≥5, ≥6, ≥10 configurations). For example, a respective subsequent configuration can be replaced by another subsequent configuration. For example, a subsequent configuration can be used to prevent a manipulation, to reduce the probability of a risk, and/or to prevent or reduce possible damage. For example, an incident can include a suspicion of a manipulation or the occurrence of a manipulation or of an attempted manipulation or cyberattack. For example, an IDPS (intrusion detection and prevention system) can detect an incident that reduces for example the (operational) security of the system. For example, a respective subsequent configuration can be replaced by another subsequent configuration. For example, based on a particular type of incident, one configuration of the plurality of configurations may be selected to replace a previous configuration. For example, corrupted system modules of a more trustworthy zone can be assigned to a less trustworthy zone. For example, access rights to system resources can be taken away from a corrupted zone or subzone.

In some examples, in addition to the domain controller (70) the computer system can include a memory protection unit (MPU) (71) used to secure individual steps of the method for enforcing the zone separation. For example, access rights to memories 63 and/or peripheral devices 61, 62 can be monitored by memory protection unit 71 in addition to domain controller 70. In some examples, memory protection unit 71 can prevent unauthorized access by a zone 51, 52, 53 and/or subzone 51a, 51b to a system resource for which access rights are not assigned to the corresponding zone 51, 52, 53 or subzone 51a, 51b. Memory protection unit 71 can be used to implement steps of method 200. For example, in the event of a failure of domain controller 70, memory protection unit 71 can be used to increase the reliability and security against failure of the system. For example, the additional use of a memory protection unit 71 may be part of a staggered defense strategy or a defense-in-depth strategy.

Also disclosed is a computer system designed to carry out the computer-implemented method 200 for enforcing a zone separation in a computer system 100 by separation of a plurality of zones. The computer system may include at least one processor and/or at least one working memory. The computer system may further include a (non-volatile) memory. In addition, computer system 100 can include a computer system [sic]. Computer system 100 can include at least one processor and/or a working memory. Computer system 100 may further include a (non-volatile) memory.

In some examples, the device for which the plurality of functions are provided by computer system 100 can be a vehicle. In some examples, computer system 100 may be situated in the vehicle (for example in the form of a vehicle computer). Additionally or alternatively, one or more functions of the plurality of functions can include functions for the operation of a vehicle or one of its components (e.g. control functions, regulating functions, monitoring functions, and/or data processing or signal processing functions). For example, one or more functions of the plurality of functions may be functions for autonomous and/or assisted driving. Alternatively or additionally, a function may be an engine controlling, a transmission controlling, a power train control function, a brake controlling, a battery management function, a human-machine interface controlling, a function for systems of the vehicle interior (e.g. an air conditioning function or a seat control), or a communication function.

In other examples, the device for which the plurality of functions are provided by computer system 100 can be a robot. In still other examples, the device for which the plurality of functions are provided by computer system 100 can be an industrial machine or industrial plant. In still other examples, the device for which the plurality of functions are provided by computer system 100 can be a building technology system.

Also disclosed is a computer program designed to carry out computer-implemented method 200 for enforcing a zone separation in a computer system 100 by separation of a plurality of zones. For example, the computer program may be in interpretable or compiled form. It can be loaded (also in parts) into the RAM of a computer for execution e.g. as a bit or byte sequence. The computer program can include multiple parts, one part executable on a computing unit 21, 22 and/or on a domain controller 70.

Also disclosed is a computer-readable medium or signal that stores and/or contains the computer program or at least a part thereof. The medium may include, for example, one of RAM, ROM, EPROM, HDD, SDD, . . . on/in which the signal is stored.

What is claimed is:

1. A computer system configured to provide a plurality of functions for a device, by separation of a plurality of zones, the computer system comprising:

a plurality of system modules that are each a respective hardware and/or software component of the computer system, wherein:

the respective hardware and/or software component of the computer system are:

configured to provide respective functions that are differently critical for operational security of the device; and grouped within the computer system into different ones of the plurality of zones, so that different ones of the plurality of zones are populated with different subsets of the plurality of system modules;

each zone of the plurality of zones is a logically and/or physically delimitable unit in the computer system;

different ones of the plurality of zones are treated by the computer system at a zone-level as of different trustworthiness levels so that a first zone of the plurality of zones more trustworthy than a second, less trustworthy zone of the plurality of zones, so that a danger of a manipulation of a more trustworthy zone is lower than of a less trustworthy zone;

the different trustworthiness levels result from assignments by the computer system of different subsets of a plurality of protective mechanisms, which handle module protection from manipulation, to different ones of the plurality of zones, so that, for each of the plurality of zones, the respective subset of the plurality of protective mechanisms is indirectly assigned to perform their respective protections for those respective ones of the plurality of system modules that are grouped into the respective zone;

the assignments of the different subsets of the plurality of protective mechanisms result in the first zone being assigned a first one of the subsets of the protective mechanisms and the second zone being assigned a second one of the subsets of the protective mechanisms;

the first one of the subsets of the protective mechanisms protects those of the plurality of modules that are assigned to the first zone from manipulation to a greater extent than that to which the second one of the subsets of the protective mechanisms protects the those of the plurality of modules that are assigned to the second zone; and the first one of the subsets of the protective mechanisms and the second one of the subsets of the protective mechanisms differ from each other in that:

the first subset of protective mechanisms reduces a danger or probability of module manipulation to a greater extent than the second subset of protective mechanisms;

the first subset of protective mechanisms includes protective mechanisms that are more complex or difficult to breach than all protective mechanisms of the second subset of protective mechanisms;

a computational power required to breach a protective mechanism of the first subset of protective mechanisms is higher than a computational power required to breach a protective mechanism of the second subset of protective mechanisms;

an amount of time required to breach a protective mechanism of the first subset of protective mechanisms is greater than an amount of time required to breach a protective mechanism of the second subset of protective mechanisms;

the first subset of protective mechanisms includes protective mechanisms that require more processing power to execute than all protective mechanisms of the second subset of protective mechanisms;

the first subset of protective mechanisms includes protective mechanisms that require longer runtime to execute than all protective mechanisms of the second subset of protective mechanisms;

the first and second subsets of protective mechanisms protect against different types of cyberattacks than each other, at least one of the protective mechanisms being a firewall;

the first subset of protective mechanisms provides an increased probability of detecting a module manipulation than the second subset of protective mechanisms; and/or the first subset of protective mechanisms provides a greater proportion of total manipulations that are detected than the second subset of protective mechanisms.

2. The computer system as recited in claim 1, wherein the device is a vehicle.

3. The computer system as recited in claim 1, wherein: i) the first one of the subsets of the protective mechanisms includes a first startup process and/or a first mechanism for securing communication, and/or, ii) the second one of the subsets of the protective mechanisms including a second startup process and/or a second mechanism for securing communication.

4. A computer-implemented method for a computer system, the computer system being configured to provide a plurality of functions for a device with a separation of a plurality of zones, the computer system including a plurality of system modules that are each a respective hardware and/or software component of the computer system, wherein: (I) the respective hardware and/or software component of the computer system are: (i) configured to provide respective functions that are differently critical for operational security of the device, (ii) grouped within the computer system into different ones of the plurality of zones, so that different ones of the plurality of zones are populated with different subsets of the plurality of system modules; (II) each zone of the plurality of zones is a logically and/or physically delimitable unit in the computer system, (III) different ones of the plurality of zones are treated by the computer system at a zone-level as being of different trustworthiness levels so that a first zone of the plurality of zones more trustworthy than a second, less trustworthy zone of the plurality of zones, so that a danger of a manipulation of a more trustworthy zone is lower than of a less trustworthy zone, (IV) the different trustworthiness levels result from assignments by the computer system of different subsets of a plurality of protective mechanisms, which handle module protection from manipulation, to different ones of the plurality of zones, so that, for each of the plurality of zones, the respective subset of the plurality of protective mechanisms is indirectly assigned to perform their respective protections for those respective ones of the plurality of system modules that are grouped into the respective zone, (V) the assignments of the different subsets of the plurality of protective mechanisms result in the first zone being assigned a first one of the subsets of the protective mechanisms and the second zone being assigned a second one of the subsets of the protective mechanisms, and (VI) the first one of the subsets of the protective mechanisms protects those of the plurality of modules that are assigned to the first zone from manipulation to a greater extent than that to which the second one of the subsets of the protective mechanisms protects the those of the plurality of modules that are assigned to the second zone, the method comprising:

sequentially performing, by a security device included as part of the first one of the subsets of the protective mechanisms, a verification of at least some steps of a booting process those of the plurality of system modules that are grouped into the first zone, the verification verifying against manipulation or corruption of the respectively verified steps, thereby establishing a chain of trust for proceeding from one of the at least some steps to subsequent ones of the at least some steps, wherein the second one of the subsets of the protective mechanisms are such that a booting process of those of the plurality of system modules that are grouped into the second zone proceeds without the chain of trust.

5. The computer-implemented method as recited in claim 4, further comprising:

assigning one or more of the plurality of system modules, or of a part of a system module of the plurality of system modules, to a respective zone of the plurality of zones.

6. The computer-implemented method as recited in claim 5, further comprising:

for each of one or more of the plurality of zones, dividing the respective zone of the plurality of zones into at least two subzones, and assigning a respective part of the one or more of the plurality of system modules of the respective zone to one of the subzones; and assigning to the zones and/or subzones rights of access to system resources that include peripheral devices and/or memories of the system.

7. The computer-implemented method as recited in claim 6, further comprising:

assigning, respectively, a logical and/or physical connection to the security device to one or more zones of the plurality of zones and/or one of more of the subzones, the security device providing cryptographic keys for the one or more zones or subzones, and each zone or subzone being permitted to access only keys that are intended for that zone or subzone.

8. The computer-implemented method as recited in claim 4, wherein the security device acts as trust anchor.

9. The computer-implemented method as recited in claim 6, further comprising:

assigning access rights for a plurality of functions provided by the security device to at least one of the zones and/or at least one of the subzones.

10. The computer-implemented method as recited in claim 7, wherein accesses to keys and/or functions provided by the security device by more trustworthy ones of the plurality of zones and/or subzones are prioritized over less trustworthy zones and/or subzones.

11. The computer-implemented method as recited in claim 6, wherein the computer system includes a domain controller that contains a plurality of domains, and the method further comprises:

assigning at least one zone of the plurality of zones and/or at least one of the subzones to at least one domain of the plurality of domains, each domain having equal access rights to system resources.

12. The computer-implemented method as recited in claim 4, wherein the method is carried out statically and authentically.

13. The computer-implemented method as recited in claim 4, wherein the method is adapted in case of suspicion or in case of a manipulation to avoid a hazardous situation.

14. The computer-implemented method as recited in claim 11, wherein the computer system includes a memory protection unit MPU that is used to secure individual steps of the method for enforcing the zone-based protection of system modules against manipulation.

15. A computer system configured to provide a plurality of functions for a device with a separation of a plurality of zones, the computer system comprising:

a plurality of system modules that are each a respective hardware and/or software component of the computer system, wherein:

the respective hardware and/or software component of the computer system are:

configured to provide respective functions that are differently critical for operational security of the device; and grouped within the computer system into different ones of the plurality of zones, so that different ones of the plurality of zones are populated with different subsets of the plurality of system modules;

each zone of the plurality of zones is a logically and/or physically delimitable unit in the computer system;

different ones of the plurality of zones are treated by the computer system at a zone-level as of different trustworthiness levels so that a first zone of the plurality of zones being more trustworthy than a second, less trustworthy zone of the plurality of zones, so that and a danger of a manipulation of a more trustworthy zone is lower than of a less trustworthy zone;

the different trustworthiness levels result from assignments by the computer system of different subsets of a plurality of protective mechanisms, which handle module protection from manipulation, to different ones of the plurality of zones, so that, for each of the plurality of zones, the respective subset of the plurality of protective mechanisms is indirectly assigned to perform their respective protections for those respective ones of the plurality of system modules that are grouped into the respective zone;

the assignments of the different subsets of the plurality of protective mechanisms result in the first zone being assigned a first one of the subsets of the protective mechanisms and the second zone being assigned a second one of the subsets of the protective mechanisms;

the first one of the subsets of the protective mechanisms protects those of the plurality of modules that are assigned to the first zone from manipulation to a greater extent than that to which the second one of the subsets of the protective mechanisms protects the those of the plurality of modules that are assigned to the second zone;

the first one of the subsets of the protective mechanisms includes a security device for sequentially performing verification of at least some steps of a booting process of those of the plurality of system modules that are grouped into the first zone, the verification verifying against manipulation or corruption of the respectively verified steps, thereby establishing a chain of trust for proceeding from one of the at least some steps to subsequent ones of the at least some steps; and the second one of the subsets of the protective mechanisms are such that a booting process of those of the plurality of system modules that are grouped into the second zone proceeds without the chain of trust.

16. A non-transitory computer-readable medium on which is stored a computer program that is executable by hardware of a computer system and that, when executed by the hardware of the computer system, causes the hardware of the computer system to execute a method for the computer system, the computer system being configured to provide a plurality of functions for a device with a separation of a plurality of zones, the computer system including a plurality of system modules that are each a respective hardware and/or software component of the computer system, wherein: (I) the respective hardware and/or software component of the computer system are: (i) configured to provide respective functions that are differently critical for operational security of the device, (ii) grouped within the computer system into different ones of the plurality of zones, so that different ones of the plurality of zones are populated with different subsets of the plurality of system modules; (II) each zone of the plurality of zones is a logically and/or physically delimitable unit in the computer system, (III) different ones of the plurality of zones are treated by the computer system at a zone-level as being of different trustworthiness levels so that a first zone of the plurality of zones more trustworthy than a second, less trustworthy zone of the plurality of zones, so that a danger of a manipulation of a more trustworthy zone is lower than of a less trustworthy zone, (IV) the different trustworthiness levels result from assignments by the computer system of different subsets of a plurality of protective mechanisms, which handle module protection from manipulation, to different ones of the plurality of zones, so that, for each of the plurality of zones, the respective subset of the plurality of protective mechanisms is indirectly assigned to perform their respective protections for those respective ones of the plurality of system modules that are grouped into the respective zone, (V) the assignments of the different subsets of the plurality of protective mechanisms result in the first zone being assigned a first one of the subsets of the protective mechanisms and the second zone being assigned a second one of the subsets of the protective mechanisms, and (VI) the first one of the subsets of the protective mechanisms protects those of the plurality of modules that are assigned to the first zone from manipulation to a greater extent than that to which the second one of the subsets of the protective mechanisms protects the those of the plurality of modules that are assigned to the second zone, the method comprising:

sequentially performing, by a security device included as part of the first one of the subsets of the protective mechanisms, a verification of at least some steps of a booting process those of the plurality of system modules that are grouped into the first zone, the verification verifying against manipulation or corruption of the respectively verified steps, thereby establishing a chain of trust for proceeding from one of the at least some steps to subsequent ones of the at least some steps, wherein the second one of the subsets of the protective mechanisms are such that a booting process of those of the plurality of system modules that are grouped into the second zone proceeds without the chain of trust.

17. The computer system as recited in claim 1, wherein the first one of the subsets of the protective mechanisms and the second one of the subsets of the protective mechanisms differ from each other in that the first subset of protective mechanisms reduces the danger or probability of module manipulation to the greater extent than the second subset of protective mechanisms.

18. The computer system as recited in claim 1, wherein the first one of the subsets of the protective mechanisms and the second one of the subsets of the protective mechanisms differ from each other in that the first subset of protective mechanisms includes the protective mechanisms that are more complex or difficult to breach than all the protective mechanisms of the second subset of protective mechanisms.

19. The computer system as recited in claim 1, wherein the first one of the subsets of the protective mechanisms and the second one of the subsets of the protective mechanisms differ from each other in that the computational power required to breach the protective mechanism of the first subset of protective mechanisms is higher than the computational power required to breach the protective mechanism of the second subset of protective mechanisms.

20. The computer system as recited in claim 1, wherein the first one of the subsets of the protective mechanisms and the second one of the subsets of the protective mechanisms differ from each other in that the amount of time required to breach the protective mechanism of the first subset of protective mechanisms is greater than the amount of time required to breach the protective mechanism of the second subset of protective mechanisms.

21. The computer system as recited in claim 1, wherein the first one of the subsets of the protective mechanisms and the second one of the subsets of the protective mechanisms differ from each other in that the first subset of protective mechanisms includes the protective mechanisms that require more processing power to execute than all the protective mechanisms of the second subset of protective mechanisms.

22. The computer system as recited in claim 1, wherein the first one of the subsets of the protective mechanisms and the second one of the subsets of the protective mechanisms differ from each other in that the first subset of protective mechanisms includes the protective mechanisms that require the longer runtime to execute than all the protective mechanisms of the second subset of protective mechanisms.

23. The computer system as recited in claim 1, wherein the first one of the subsets of the protective mechanisms and the second one of the subsets of the protective mechanisms differ from each other in that the first and second subsets of protective mechanisms protect against the different types of cyberattacks than each other, the at least one of the protective mechanisms being the firewall.

24. The computer system as recited in claim 1, wherein the first one of the subsets of the protective mechanisms and the second one of the subsets of the protective mechanisms differ from each other in that the first subset of protective mechanisms provides the increased probability of detecting the module manipulation than the second subset of protective mechanisms.

25. The computer system as recited in claim 1, wherein the first one of the subsets of the protective mechanisms and the second one of the subsets of the protective mechanisms differ from each other in that the first subset of protective mechanisms provides the greater proportion of total manipulations that are detected than the second subset of protective mechanisms.

* * * * *